United States Patent [19]

Chambers, Jr.

[11] 4,054,942

[45] Oct. 18, 1977

[54] TIP AUTOMATIC NUMBER IDENTIFICATION CIRCUIT

[75] Inventor: Charles W. Chambers, Jr., Amherst, Ohio

[73] Assignee: Lorain Products Corporation, Lorain, Ohio

[21] Appl. No.: 686,252

[22] Filed: May 13, 1976

[51] Int. Cl.² .......................................... H04M 15/36
[52] U.S. Cl. ............................ 179/17 A; 179/8.5
[58] Field of Search ............... 179/17 A, 8.5, 18 FA, 179/18 F, 18 FH, 27 DB, 27 E

[56] References Cited

U.S. PATENT DOCUMENTS

| | | | |
|---|---|---|---|
| 2,820,848 | 1/1958 | Horwitz et al. | 179/8.5 |
| 3,005,052 | 10/1961 | Powers | 179/17 A |
| 3,278,687 | 10/1966 | Everett | 179/17 A |
| 3,863,036 | 1/1975 | McCrudden | 179/8.5 |
| 4,001,512 | 1/1977 | Proctor et al. | 179/17 A |

Primary Examiner—Kathleen H. Claffy
Assistant Examiner—Gerald L. Brigance
Attorney, Agent, or Firm—Edward C. Jason; Michael M. Rickin

[57] ABSTRACT

A circuit for identifying which one of two parties has initiated a toll call. Circuitry connected to the subscriber drop of one party, e.g., the tip party of a two-party telephone line, generates a ground mark during the toll ticketing condition when that tip party has initiated a toll call. Loop current sensing circuitry senses the loop current flowing in the subscriber drop to the tip party. Voltage sensing circuitry senses the potential, with respect to ground, on each conductor of the telephone line. Switching circuitry applies a groundmark to the telephone line when loop current flow to the tip party has been interrupted and negative potential is applied to the tip conductor. Circuitry is also provided which prevents the application of a ground mark when a ringing voltage is applied to the line.

14 Claims, 1 Drawing Figure

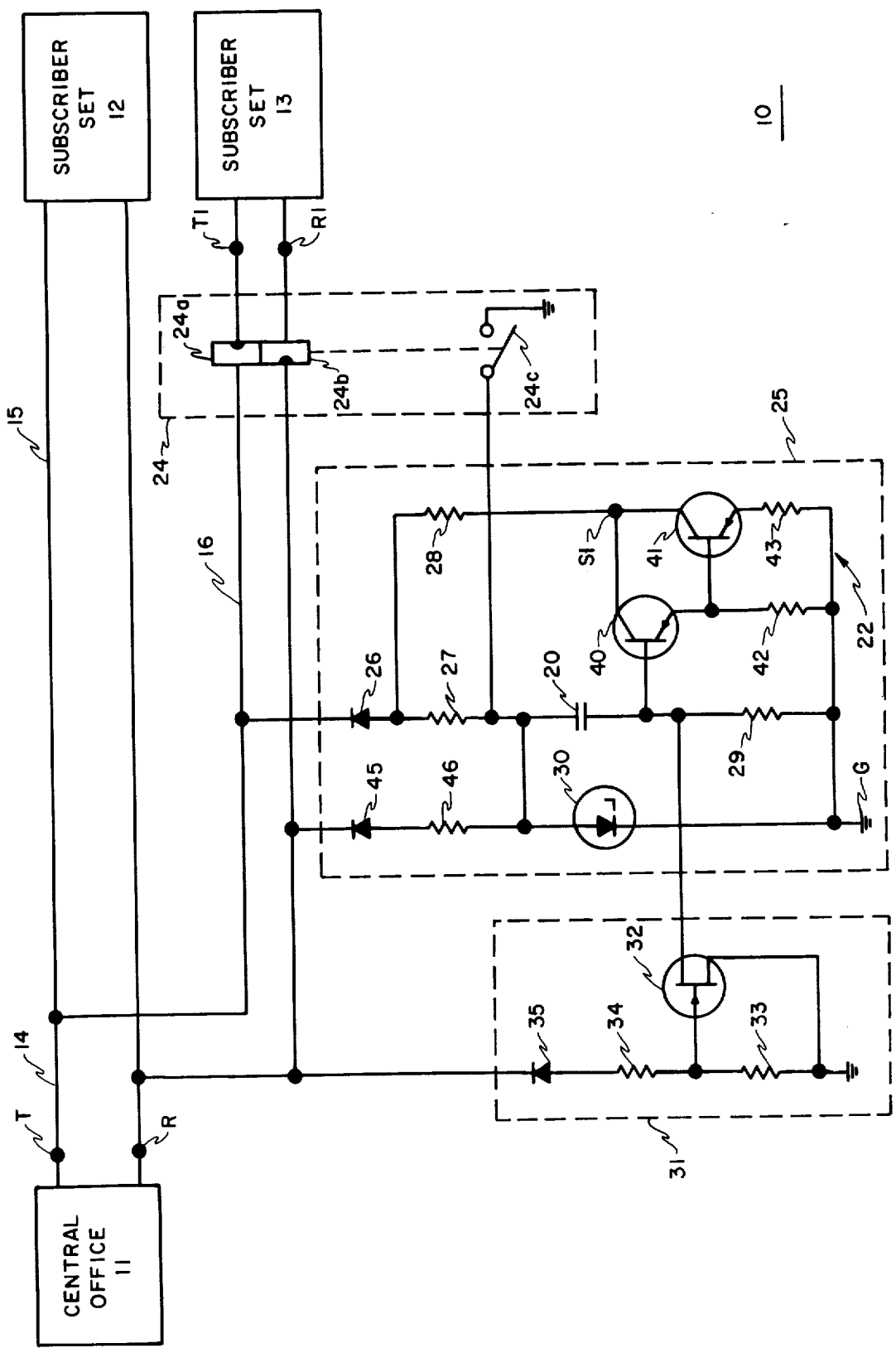

TIP AUTOMATIC NUMBER IDENTIFICATION CIRCUIT

BACKGROUND OF THE INVENTION

The present invention relates to circuitry for identifying which subscriber of a two-party telephone line is initiating a toll call and is directed more particularly to circuitry for providing tip automatic identification (tip ANI) for two-party lines.

In telephone systems it is often desirable to establish a two-party line be connecting two different subscribers or parties to the same telephone line. Although many signalling functions are not affected by having both parties connected to the same line, a problem arises when it is necessary for the central office equipment to identify which party of the two-party line is initiating a toll call.

Currently, it is the practice in the industry to connect, to the telephone set of a designated one of the parties (hereinafter referred to as the tip party or party two), circuitry which applies ground potential to the tip conductor through a current-limiting resistor. The subscriber drop of the other or nondesignated party (hereinafter referred to as the ring party or party one) does not have such circuitry connected thereto. As a result, when the central office equipment establishes the toll ticketing condition by applying negative potential to both conductors of the telephone line, a current will flow through the tip conductor only when party two initiates a toll call. The central office equipment detects the presence or absence of a current flow in the tip conductor and thereby identifies which party has initiated the toll call.

If, for example, the ring party (party one) initiates a toll call, no current will flow through the tip conductor when the central office equipment applies negative potential to both conductors of the telephone line. The central office equipment will detect that no current is flowing through the tip conductor and will thereby determine that party one has initiated the toll call. If, on the other hand, the tip party (party two) initiates a toll call, the ground connection to the tip conductor will cause a current to flow through the tip conductor when the central office equipment applies negative potential to both conductors of the line. As a result, the central office equipment will detect the current flow through the tip conductor and will thereby determine that party two has initiated the toll call. Thus, during the toll ticketing condition, the presence or absence of a current flow in the tip conductor of the telephone line enables the central office equipment to identify which party has initiated the toll call.

As described above, the toll ticketing condition is established when the central office equipment applies negative potential to both conductors of the telephone line. In different telephone systems, the central office equipment may establish the toll ticketing condition at different times. In one type of telephone system, the toll ticketing condition is established during dialing. In these telephone systems, loop current flow to one of the subscribers is established when that subscriber goes off-hook. The central office senses the loop current and applies a dial tone to the telephone line to signal that the subscriber may begin dialing. The dial pulses are sensed by the central office equipment in order to operate the switching circuits. In addition, the central office senses the occurrence of the first open interval of a designated digit, e.g., the first open interval of the second digit, and establishes the toll ticketing condition by applying negative potential to both conductors of the telephone line during a portion of this open interval. During this portion of the open interval, the central office senses the absence or presence of current flow in the tip conductor in order to identify which one of the subscribers has initiated the toll call. Upon completion of the toll ticketing condition, the central office equipment returns to the dialing condition. It will be understood that the establishment of the toll ticketing condition during an open interval of a dial pulse does not interfere with the dialing operation.

In other types of telephone systems, the toll ticketing condition may occur before dialing, after dialing, or both before and after dialing. In telephone systems which establish the toll ticketing condition both before and after dialing, loop current flow to one of the subscribers is established when that subscriber goes off-hook. At this time, the central office equipment establishes the toll ticketing condition by applying negative potential to both conductors of the telephone line and senses the absence or presence of a current flow in the tip conductor of the line in order to identify which party has initiated the toll call. After the toll ticketing condition has been terminated, the central office equipment applies a dial tone to the telephone line to signal that the subscriber may begin dialing. The dial pulses are sensed by the central office equipment and operate the switching circuits. After all of the digits have been dialed, the central office equipment again establishes the toll ticketing condition and senses the presence or absence of a current in the tip conductor in order to identify which one of the parties has initiated the toll call.

Many prior art tip ANI circuits comprise a resistor and inductor connected between the tip conductor and ground whenever the subscriber is off-hook. This ground connection to the tip conductor is maintained during the calling and talking states. As a result, these resistor-inductor ANI circuits allow an undesirable electrical noise to appear in the telephone line. In addition, these prior art ANI circuits have been physically housed in the telephone set. As a result, false billings occur when unauthorized phones not having these resistor-inductor ANI circuits are exchanged for or are added to existing phones having that type of ANI circuit. Thus, many prior art ANI circuits are undesirable because they introduce noise into the telephone line and may cause false billings.

Realizing the problems associated with the above-described resistor-inductor type ANI circuits, a few ANI circuits have been designed which do not connect ground to the telephone line during the talking state and which are to be connected to the outside of the building housing the subscriber set. While these circuits do not introduce excessive noise in the telephone line and allow the subscriber to expand or exchange phones without having the problem of false billings, they are too complicated and, therefore, too expensive to be practical.

SUMMARY OF THE INVENTION

It is an object of the invention to provide an improved automatic number identification circuit for two-party lines.

Another object of the invention is to provide an ANI circuit which is relatively simple to fabricate and relatively low in cost.

Still another object of the invention is to provide an ANI circuit which need not be physically housed in the telephone set and which may service a number of extension phones.

It is another object of the invention to provide circuitry which applies a ground mark to the tip conductor of the telephone line when loop circuit flow to the tip party is interrupted and a negative potential is applied to the tip conductor.

Yet another object of the invention is to provide circuitry which removes the ground mark after the toll ticketing condition.

A further object of the invention is to provide circuitry for preventing a ground mark from being applied to the tip conductor of the telephone line when a ringing voltage is applied to that line.

Yet another object of the invention is to provide switching circuitry for applying ground potential to the tip conductor of the telephone line when a negative potential is applied to the central office end of that tip conductor.

Still another object of the invention is to provide circuitry of the above character including a transient conducting device for enabling the switching circuitry to apply a ground mark for a predetermined time when negative potential is applied to either conductor of the telephone line.

It is still another object of the invention to provide circuitry of the above character including a loop current detector which inhibits the generation of a ground mark or pulse when loop current is flowing to the tip party.

DESCRIPTION OF THE DRAWING

The single drawing is a schematic diagram of one embodiment of the invention together with its environmental circuitry.

DESCRIPTION OF THE PREFERRED EMBODIMENT

Referring to the drawing, there is shown a first subscriber set 12 connected to a central office 11 through a subscriber drop 15 and a two-party telephone line 14. Also shown in the drawing is a second subscriber set 13 which is connected to the central office through a tip ANI circuit 10, a subscriber drop 16, and telephone line 14. Subscriber sets 12 and 13 comprise, respectively, the first and second parties of a two-party telephone line. For purposes of description, subscriber set 12 will also be referred to as party one or the ring party and subscriber set 13 will also be referred to as party two or the tip party.

In order to identify which party of the two-party line is initiating a toll call, central office 11 applies negative potential to a tip conductor T and a ring conductor R after loop current flow has been established. Under the above conditions, tip ANI circuit 10 serves to generate a ground mark or pulse when party two is off-hook, but does not generate a ground mark when party one is off-hook. In other words, when central office 11 is attempting to determine which one of the parties has initiated a toll call, a ground mark is applied to the tip conductor of the line when party two has initiated the call and no ground mark is applied to the line when party one has initiated the toll call.

To the end that ANI circuit 10 may apply a ground mark to the tip conductor of the telephone line during the toll ticketing condition, when subscriber set 13 is off-hook, there are provided therein, a loop current sensor 24 and a ground mark switching network 15. Ground mark switching network 25 applies a ground mark to the tip conductor of the transmission line, for a predetermined time, when a negative potential is applied to that tip conductor. Loop current sensor 24 detects loop current flow when subscriber set 13 is off-hook and prevents ground mark switching circuit 25 from applying a ground mark until that loop current flow is interrupted. As will be described more fully presently, switching network 25 and loop current sensor 24 cooperate to apply a ground mark or pulse to tip conductor T only when a negative voltage is applied to that tip conductor after loop current flow to the tip party is interrupted. In addition, switching network 25 and loop current sensor 24 cooperate to prevent the application of a ground mark or pulse to the telephone line when a negative voltage is not applied to the tip conductor or when loop current flow to the ring party is interrupted.

To the end that switching network 25 may apply a ground mark to the tip conductor of the telephone line, there are provided therein, diodes 26 and 45, current limiting resistors 27, 28, and 46, a transient conducting device shown herein as a capacitor 20, and a transistor switching circuit 22 comprising transistors 40 and 41 and biasing resistors 29, 42, and 43. Transistor switching circuit 22 is a two-state switching circuit having a first or non-conducting state in which terminal S1 is not connected to ground G and a second or operative state in which terminal S1 is connected to ground G through a relatively small resistance. Resistor 28 is connected to terminal S1 and is connected, through a diode 26, to tip conductor T. Diode 26 is forward biased, i.e., conducting, when a negative potential is applied to the tip conductor. As a result, when switching circuit 22 is in its second or conducting state and negative potential is applied to tip conductor T, resistor 28 is connected between ground G and tip conductor T. In other words, when switching circuit 22 is in its conducting state and negative potential is applied to tip conductor T, a ground mark is applied to the tip conductor of the telephone line.

The second or conducting state of transistor switching circuit 22 is established when capacitor 20 conducts a current above a present level through biasing resistor 29. Capacitor 20 conducts a current flow through resistor 29 when a negative potential is applied to one or both of the conductors of the telephone line. The magnitude of this current flow is above the preset level when capacitor 20 is initially charging and falls below the preset level after capacitor 20 has charged for a predetermined time. In summary, when a negative potential is applied to one or both of the conductors of the telephone line, capacitor 20 causes transistor switching circuit 22 to establish its second or conducting state for a predetermined time.

The operation of ground mark switching network 25 will now be described in more detail. In order that transistor switching circuit 22 may connect terminal S1 to ground G, transistors 40 and 41 are connected in the well-known Darlington configuration and operate as a high-gain transistor switch to connect ground G to terminal S1 when a current sufficient to turn on transistor 40 is flowing through resistor 29. In the present embodiment, the resistances of resistors 29, 42, and 43 are selected so that transistors 40 and 41 will turn fully on when a current above a preset level flows through resistor 29 and so that transistors 40 and 41 will be off when a current slightly below the preset level flows through resistor 29. Thus, transistor switching circuit 22 connects ground G to terminal S1, when a preset current flows through resistor 29 and does not connect ground G to terminal S1 when a current below that preset level flows through resistor 29.

The connection of ground G to terminal S1 establishes a current flow through the tip conductor of the telephone line when a negative voltage is applied to that tip conductor. This current flows from ground G through switching circuit 22, current limiting resistor 28, and blocking diode 26 to central office 11. Blocking diode 26 is forward-biased and, therefore, allows current to flow therethrough only when a negative potential is applied to the tip conductor of the telephone line and is reverse-biased and, therefore, blocks a current flow there-through when positive or ground voltages are applied to the tip conductor. The resistance of resistor 28 is selected to be approximately equal to the resistance of the resistors in prior art ANI circuits. As a result, the current which flows through the tip conductor is substantially the same in magnitude as a current which would flow if one of the prior art ANI circuits was utilized. In summary, switching network 22, resistor 28, and diode 26 cooperate to apply a ground mark to the tip conductor of the telephone line when a negative potential is applied to that tip conductor and network 22 is in its second state.

To the end that the second state of switching network 22 may be established when a negative potential is applied to either conductor of the telephone line, capacitor 20 is connected to resistor 29, to tip conductor T through resistor 27 and diode 26, and to ring conductor R through resistor 46 and diode 45. Diode 26 is forward biased when a negative potential is applied to the tip conductor and diode 45 is forward biased when a negative potential is applied to the ring conductor. As a result, when a negative potential is applied to the tip conductor and capacitor 20 is not charged, a current flows from ground G, through resistor 29, capacitor 20, resistor 27, and diode 26, to tip conductor T. Similarly, when a negative potential is applied to the ring conductor and capacitor 20 is not charged, a current flows from ground through resistor 29, capacitor 20, resistor 46, and diode 45 to that ring conductor. It will be understood that the resistances of resistors 27 and 46 are approximately equal in magnitude to prevent line imbalance and relatively high in magnitude to limit leakage currents. Thus, when a negative potential is applied to either the tip or ring conductor when capacitor 20 is not charged, that capacitor conducts a current flow through resistor 29.

This latter current initially is relatively large, that is, greater than the preset level, and decreases as capacitor 20 charges. After a predetermined time, this current will decrease below the preset level. Since this current flows through resistor 29, switching network 22 will assume its second or conducting state when capacitor 20 is initially charging and will assume its first or non-conducting state after capacitor 20 has charged to a relatively high potential. In other words, when capacitor 20 is discharged and a negative voltage is applied to either the tip or ring conductors, capacitor 20 establishes, for a predetermined time, a current through resistor 29 which forces transistor switching network 22 to assume its conducting state.

The predetermined time which capacitor 20 establishes the above-described current flow and, therefore, the maximum time which switching network 22 is in its second state, is determined primarily by the capacitance of capacitor 20 and the relatively high resistance of resistors 27 and 46. It will be understood, however, that the above ground mark may be removed by the central office equipment by removing the negative potential on the tip conductor or by re-establishing loop current.

As previously described, loop current sensor 24 detects loop current flow to subscriber 13 and allows ground mark switching network 25 to apply a ground mark when that loop current flow is interrupted. In the present embodiment, sensor 24 comprises a relay having a first winding 24a connected between terminals T and T1, a second winding 24b connected between terminals R and R1, and a normally-open contact 24c. Relay 24 is energized when loop current is flowing through subscriber drop 16 and is not energized when that loop current is not flowing through subscriber drop 16. Consequently, contact 24c is closed when the above-described loop current is flowing and is open when that loop current is not flowing. Since contact 24c is connected between ground G and capacitor 20, capacitor 20 will discharge when contact 24c is closed. As a result, as long as contact 24c is closed, switching circuit 22 will be unable to assume its second state. Thus, loop current sensor 24 prevents ground mark switching network 25 from applying a ground mark when loop current is flowing to subscriber 13.

After loop current flow to subscriber 13 has been interrupted, contact 24c opens and capacitor 20 is allowed to charge. If negative potential is applied to either conductor, capacitor 20 charges and thereby causes switching circuit 22 to assume its second state for a predetermined time. After capacitor 20 has charged for the predetermined time, switching circuit 22 will again assume its second state again until contact 24c closes and discharges capacitor 20. Thus, loop current sensor 24 senses the loop current in subscriber drop 16 and allows ground mark switching network 25 to apply a ground mark only after that loop current flow has been interrupted.

Also provided in ANI circuit 10 is a zener diode 30 connected across capacitor 20 and resistor 29. Diode 30 clamps the voltage across capacitor 20 to the breakdown voltage of diode 30. As a result, capacitor 20 does not charge to a potential approximately equal to the voltage of the central office battery but instead charges to a value below the central office battery. This prevents changes in voltage across the line from changing the voltage on capacitor 20. As a result, capacitor 20 is prevented from conducting a current through resistor 29 and is thereby prevented from allowing transistor switching circuit 22 to assume its second state. Such changes in voltage across the line may, for example, be due to dial pulses generated by party one or to ringing voltages applied to the line. Thus, zener diode 30 prevents dial pulses generated by party one and ringing voltages applied to the line from changing the state of transistor switching circuit 22.

In view of the foregoing, it will be seen that loop current sensor 24 prevents ground mark switching network 25 from assuming its second state when loop current is flowing through subscriber line 16 and allows ground mark switching network 25 to apply a ground mark to the tip conductor of the telephone line when loop current flow to subscriber 13 has been interrupted and a negative potential is applied to the tip conductor. Thus, when subscriber 13 is initiating a toll call and the central office applies a negative potential to the tip and ring conductors of the subscriber line in order to identify which party is initiating the toll call, ANI circuit 10 applies a ground mark or pulse to the tip conductor of the subscriber line.

In some telephone systems, a ringing voltage may be applied to telephone line 14 which might cause ANI circuit 10 to generate a ground mark or pulse. A ground mark during the ringing condition is undersirable since that pulse might operate the ringtrip relay, thereby indicating answer by the called party. It is, therefore, desirable to prevent a ground mark during ringing.

To the end that ground mark switching network 25 may be pevented from applying a ground mark to the telephone line during ringing, there is provided in ANI circuit 10 a ringing disabling circuit 31. Circuit 31 disables switching network 25 when a ground potential is applied to the ring conductor of the telephone line and enables switching network 25 when a negative potential is applied to that ring conductor. More particularly, disabling circuit 31 disables network 25 by preventing capacitor 20 from establishing a current through resistor 29, thereby preventing network 22 from assuming its second state during ringing. In addition, disabling circuit 31 enables network 25 by allowing capacitor 20 to establish a current through resistor 29 and thereby allows network 22 to assume its second state during toll ticketing. As a result, network 25 cannot apply a ground mark to conductor T when a ringing voltage is applied to the telephone line and may apply a ground mark to conductor T during toll ticketing.

To the end that disabling circuit 31 may perform the abovedescribed disabling and enabling functions, there are provided therein, a field effect transistor (FET) 32, a voltage-dividing network comprising resistors 33 and 34, and a diode 35. FET 32 establishes a relatively low resistance between its source and drain leads when a ground potential is applied to its gate lead and establishes a relatively high resistance between its source and drain leads when a negative potential is applied to its gate lead. In other words, FET 32 operates as a switch wherein its source-drain lead are effectively short-circuited when a ground potential is applied to its gate lead and its source-drain leads are effectively open-circuited when a negative potential is applied to its gate lead.

FET 32 has its source-drain leads connected across resistor 29 and its gate lead connected to the tap of voltage divider 33-34. In addition, one end of voltage divider 33-34 is connected, through diode 35, to ring conductor R and the other end of voltage divider 33-34 is connected to ground. As a result of these connections, when a ground potential is applied to the ring conductor, e.g., when a ringing voltage is applied to the telephone line, diode 35 will not be forward-biased. Under this condition, no current will flow through voltage-divider 33-34 and a ground potential will be applied to the gate of FET 32. As a result, FET 32 establishes a relatively low resistance between its source and drain leads.

This relatively low resistance is connected in parallel with resistor 29. The resistance which FET 32 establishes in parallel with resistor 29 is selected so as to prevent transistor switching circuit 22 from assuming its second or conducting state. In other words, when the source-drain leads of FET 32 are effectively short-circuited, FET 32 disables ground mark switching network 25. Thus, when a ground potential is applied to ring conductor R, disabling circuit 31 prevents network 25 from applying a ground mark to the telephone line.

When a negative potential is applied to the ring conductor, diode 35 is forward biased and allows a current to flow through voltage divider 33-34. This current flow establishes a negative potential on the gate lead of FET 32, thereby causing an effective open circuit between the source drain leads of FET 32. As a result, disabling circuit 31 does not prevent transistor switching circuit 22 from assuming its second state. Thus, when a negative potential is applied to the ring conductor, disabling circuit 31 does not prevent ground mark switching network 25 from applying a ground mark to the telephone line.

It will be seen that a negative potential is customarily applied to both the ring and tip conductors during the toll ticketing condition. As previously described, one type of telephone system establishes the toll ticketing condition during dialing. In these systems a negative potential is applied both to the tip and ring conductors at the central office. In other types of telephone systems, the toll ticketing condition is established after dialing. In this system, the central office applies a negative potential to the tip conductor and the central office either connects the same negative potential to the ring conductor or open circuits that ring conductor. If the ring conductor is open circuited, however, the negative potential which is applied to the top conductor appears on the ring conductor through subscriber set 13. Thus, negative potential is present on the tip and ring conductors during the toll ticketing condition.

In view of the foregoing, it will be seen that disabling circuit 31 disables ground mark switching network 25 when a ground potential is applied to the ring conductor, e.g., during ringing, and does not disable switching network 25 when a negative voltage is applied to the ring conductor, e.g., during toll ticketing.

OPERATION

The operation of TIP ANI circuit 10 during calls initiated by subscribers 12 and 13 will now be described. In the following description, it will be assumed that the toll ticketing condition occurs during the first open interval of the first dial pulse.

a. Call initiated by subscriber 13.

When subscribers 12 and 13 are on-hook, the central office battery is connected across the tip and ring conductors of the telephone line. Typically, the negative terminal of the central office battery is connected to the ring conductor and the positive terminal, which is grounded, is connected to the tip conductor. As a result, capacitor 20 will be charged. In addition, relay 24 is de-energized and contact 24c is open since no loop current will be flowing through subscriber drop 16.

Under the above conditions, when subscriber 13 does off-hook, loop current will flow through subscriber drop 16. As a result of this loop current flow, relay 24 energizes, thereby closing contact 24c and discharging capacitor 20. In addition, the central office equipment senses the loop current flow and applies a dial tone to telephone line 14.

In response to the dial tone, subscriber 13 will begin dialing. During the first interruption of loop current flow, relay 24 will de-energize, thereby opening contact 24c. In addition, the central office equipment will establish the toll ticketing condition by applying negative battery to the tip and ring conductors of the telephone line. This negative voltage forward biases diode 26, thereby establishing a current flow through capacitor 20 and resistor 29. This current flow forces transistor switching circuit 22 to assume its second state. As a result, ground mark switching network 25 applies a ground mark to the tip conductor.

As capacitor 20 charges, the current through resistor 29 decreases. After a predetermined time the current through that resistor is insufficient to force network 22 to assume its second state. Consequently, the ground mark will be removed. Thus, during the toll ticketing condition, ANI circuit 10 applies a ground pulse to the tip conductor of the telephone line when subscriber 13 is off-hook.

When the toll ticketing condition is completed, the central office equipment will again connect the negative terminal of the central office battery to the ring conductor and will connect ground to the tip conductor. Since the first dial pulse interruption is not completed, however, loop current will not flow.

Upon the completion of the open interval of the dial pulse, loop current will again flow, thereby energizing relay 24, closing contact 24c, and discharging capacitor 20. It will be understood that capacitor 20 will continue to discharge in the above-described manner as further dial pulses are generated by subscriber 13. Although this charging and discharging of capacitor 20 forces transistor switching circuit 22 to assume its second and first states, respectively, no ground mark is applied to the tip conductor since the diode 26 will not be forward biased.

After dialing is completed, loop current will again flow through subscriber line 16, thereby energizing relay 24 which closes contact 24c. As a result, capacitor 20 will discharge. This condition will be maintained during the talking state.

Upon disconnection or release, i.e., when subscriber 13 goes on-hook, relay 24 will de-energize, thereby opening contact 24c. As a result, capacitor 20 will charge, but a ground mark will not be applied to the telephone line since diode 26 will not be forward biased.

b. Call initiated by subscriber 12.

As described above, when subscribers 12 and 13 are on-hook relay 24 is de-energized and capacitor 20 is charged. Under this condition when subscriber 12 goes off-hook, loop current will flow through subscriber line 15. Capacitor 20, however, will remain charged. As a result, when the negative voltage is applied to the tip conductor of the transmission line during the toll ticketing condition, no current will flow through that capacitor. Thus, during the toll ticketing condition, no ground mark is applied to the transmission line when subscriber 12 is off-hook.

Capacitor 20 will remain charged during the talking state and upon disconnection or release. Thus, when subscriber 12 initiates a toll call, no ground mark is applied to the telephone line.

In view of the foregoing, it will be seen that a circuit constructed in accordance with the invention will provide a ground mark when a negative potential is applied to the tip and ring conductors of the line after the establishment of loop current flow to subscriber 13. In addition, it will be seen that a ground mark will not be applied to the line when a negative potential is applied to the tip and ring conductors of the line after the establishment of loop current flow to subscriber 12.

It will be understood that the above-described embodiment is for illustrative purposes only and may be changed or modified without departing from the spirit and scope of the appended claims.

I claim:

1. In a circuit for applying a ground mark to the tip conductor of a transmission line to identify which party of a multiparty line has initiated a call, the combination of:
    ground mark switching means for applying a ground mark to the tip conductor, for a predetermined time, when a negative potential is applied to that tip conductor and
    loop current detecting means for preventing the switching means from applying the ground mark until loop current flow to a predetermined one of the parties is interrupted.

2. A circuit as set forth in claim 1 wherein the switching means includes transient conducting means for conducting an energizing current for said switching means, for a predetermined time, when a negative potential is applied to either conductor of the transmission line.

3. A circuit as set forth in claim 2 wherein the transient conducting means is connected to each conductor of the transmission line through a diode.

4. A circuit as set forth in claim 2 wherein the loop current detecting means comprises a relay having at least one winding connected to sense the loop current supplied to the predetermined one of the parties and having a normally-open contact connected across the transient conducting means.

5. A circuit as set forth in claim 1 wherein the switching means includes a current-limiting resistor and means for connecting that resistor between the tip conductor and ground when a negative potential is applied to the tip conductor.

6. A circuit as set forth in claim 1 further comprising disabling means for preventing the ground mark switching means from applying a ground mark to the line during ringing.

7. In a circuit for applying a ground mark to the tip conductor of a two-conductor transmission line to identify which party of a multi-party line has initiated a call, the combination of:
    a ground terminal;
    a current-limiting resistor;
    a switching circuit connected to the resistor and to the ground terminal, the switching circuit having a first or nonconducting state wherein the resistor is not connected between the tip conductor and the ground terminal and a second or conducting state wherein the resistor is connected between the tip conductor and the ground terminal when a negative potential is applied to the tip conductor;
    transient conducting means for causing the switching circuit to assume its second state, for a predetermined time, when a negative potential is applied to either conductor of the transmission line; and
    a loop current detector for preventing the transient conducting means from causing the switching circuit to assume its second state when loop current is flowing to a predetermined one of the parties.

8. A circuit as set forth in claim 7 wherein the transient conducting means comprises a capacitor which is connected to each conductor of the transmission line through a diode.

9. A circuit as set forth in claim 8 further comprising means for preventing dial pulses of the other party from changing the voltage across the capacitor.

10. A circuit as set forth in claim 7 wherein the loop current detector comprises a relay having at least one winding connected to sense the loop current supplied to the predetermined one of the parties and a normally-open contact connected to the transient conducting means.

11. A circuit as set forth in claim 7 further comprising a disabling circuit preventing the switching circuit from assuming its second state wherein the ground terminal is connected, through the resistor, to the tip conductor, when a negative potential is not present on the other conductor.

12. In a circuit for applying a ground mark to the tip conductor of a transmission line to identify which party of a multiparty line has initiated a call, the combination of:
 a ground terminal;
 first and second diodes;
 a current-limiting resistor;
 a switching circuit having a control circuit and a responsive circuit, the responsive circuit connected, through the first diode and the resistor, between the tip conductor and the ground terminal;
 a capacitor having first and second terminals, the first terminal connected, through the first diode, to the tip conductor and connected, through the second diode, to the ring conductor and the second terminal connected, through the control circuit of the switching circuit to the ground terminal; and
 a relay having first and second windings and a normally-open contact, the first winding connected in series with the tip conductor, the second winding connected in series with the ring conductor, and the contact connected between the first terminal of the capacitor and the ground terminal.

13. A circuit as set forth in claim 12 further comprising a ringing disabling circuit connected to the ring conductor, to the ground terminal, and to the second terminal of the capacitor.

14. A circuit as set forth in claim 13 wherein the ringing disabling circuit comprises:
 a field-effect transistor having its source and drain leads connected between the second terminal of the capacitor and the ground terminal and
 a voltage divider having its ends connected, through a diode, between the ring conductor and the ground terminal and having its tap connected to the gate of the transistor.

* * * * *